United States Patent [19]

Kaneko

[11] 3,935,613
[45] Feb. 3, 1976

[54] DETACHABLE LUGGAGE CASTER ROLLER UNIT

[75] Inventor: Katsuyoshi Kaneko, Tokyo, Japan

[73] Assignee: Maruwa Echo Co., Ltd., Tokyo, Japan

[22] Filed: Dec. 23, 1974

[21] Appl. No.: 535,666

[30] Foreign Application Priority Data
Oct. 26, 1974  Japan.............................. 49-129805

[52] U.S. Cl. ................................... 16/30
[51] Int. Cl.² ......................................... B60B 33/00
[58] Field of Search................. 16/29, 30, 18 R, 31

[56] References Cited
UNITED STATES PATENTS

| 1,709,972 | 4/1929 | Dibsdale | 16/30 |
|---|---|---|---|
| 2,782,045 | 2/1957 | Hulbert | 16/30 X |
| 2,790,196 | 4/1957 | Rideout et al. | 16/31 R |
| 3,608,127 | 9/1971 | Lewin | 16/30 |

Primary Examiner—George H. Krizmanich

[57] ABSTRACT

A detachable luggage caster roller unit comprising a caster roller which is swivelly supported by a base plate and a separate seat adapted to be secured to a bottom or lateral end of the luggage to receive and anchor the base plate of the caster roller. The seat for anchoring the caster roller comprises a substantially rectangular plate of a predetermined thickness having a cavity with two symmetrical grooves adapted to embrace the opposite sides of the base plate. The cavity at its bottom is provided with two symmetrical slits to form a resilient tongue with a weir positioned in an outer end thereof and adapted to prevent the base plate of the caster roller unit from slipping out the seat.

3 Claims, 5 Drawing Figures

DETACHABLE LUGGAGE CASTER ROLLER UNIT

BACKGROUND AND SUMMARY OF THE INVENTION

This invention relates to an attachable and detachable caster roller unit for suitcases, luggages and the like which are brought from place to place by manual effort.

Hitherto, many kinds of caster roller units have been developed and placed in use for attachement to one end of a suitcase or other item of luggage. However, the conventional caster roller units are generally inconvenient in attachment to or detachment from the object.

To improve the disadvantages of the conventional caster roller unit, the inventor has provided a new detachable luggage caster roller unit which comprises a caster roller swivelly supported by a base plate and a separate seat adapted to be secured to a bottom or lateral end of the luggage to receive the base plate of the caster roller. The inventor's first caster roller unit of this type, however, has such the defect that the caster roller is sometimes slipped out the seat on movement of the luggage from place to place. To prevent this defect, a resilient stopper has been provided in the seat, nevertheless it is cumbersome for manufacture and disadvantageous in cost.

It is, therefore, a general object of the invention to provide a caster roller unit which is conveniently attachable to and detachable from the luggage but never separated therefrom on movement of the luggage and is manufactured at low cost.

In accordance with my invention, the detachable luggage caster roller unit includes a caster roller which is swivelly supported by a base plate and a separate seat adapted to be secured to a bottom end of the luggage to receive and anchor the base plate of the caster roller. The seat for anchoring the caster roller is typically comprised of a substantially rectangular plate of a predetermined thickness having a cavity with two symmetrical grooves adapted to embrace the opposite sides of the base plate. The cavity at its flat bottom is provided with two symmetrical slits to form a resilient tongue with a weir positioned at an outer end thereof and adapted to prevent the base plate of the caster roller from slipping out the seat.

A principal object of the invention is, therefore, to provide a detachable caster roller unit including a caster roller which is swivelly supported by a base plate and a separate seat adapted to be secured to a bottom end of the luggage to receive and anchor the base plate of the caster roller and comprising a substantially rectangular plate of a predetermined thickness which is formed with a cavity with two symmetrical grooves adapted to embrace the opposite sides of the base plate, said cavity at its flat bottom is provided with two symmetrical slits to form a resilient tongue with a weir positioned at an outer end thereof and adapted to prevent the base plate of the caster roller from slipping out the seat.

The caster roller per se used in the present invention is a known type. Accordingly, it will be appreciated that the present invention is particularly directed to the seat which is secured to the bottom or lateral end of the luggage for attachment and detachment of the caster roller.

Another object of the invention is, therefore, to provide a seat for anchoring the caster roller which comprises a substantially rectangular plate of a predetermined thickness having a cavity with two symmetrical grooves adapted to embrace the opposite sides of the base plate of the caster roller, said cavity at its bottom is provided with two symmetrical slits to form a resilient tongue with a weir adapted to prevent the base plate of the caster roller from slipping out the seat.

The seat may be integrally formed of plastic material for example by the convenient injection molding process. The resilient tongue at its rear side is provided with a rib acting as a lever to increase a resiliency of the tongue on the manual depression thereof for attachment or detachment of the caster roller from the seat.

With the above and other objects in view, the invention comprises certain new and useful construction, combinations and arrangements of parts, clearly described in the following specification and fully illustrated in the accompanying drawing, in which:

DETAILED DESCRIPTION OF THE PREFERRED EMBODIMENTS

Figure 1:
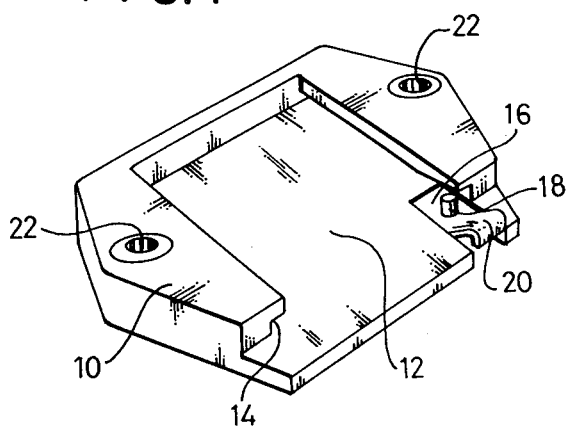
FIG. 1 is a perspective view of the seat for anchoring the caster roller according to one embodiment of the invention.

In FIG. 1, the seat 10 for anchoring the caster roller in accordance with the secondary invention comprises a substantially hexagonal plate of a predetermined thickness of 10 mm for example and is formed with a cavity of virtually rectangular form 12 with two symmetrical grooves 14 adapted to embrace the opposite sides of the base plate of the caster roller as hereinafter fully described.

The front end portion of the flat cavity is partially recessed to accommodate a resilient stopper 16 which is provided with a point projection 18 and a curved end 20. The seat 10 is further provided with two symmetrical openings 22, 22 for receiving studs or screws on securing the seat 10 to the bottom or lateral end of the luggage.

Figure 2:
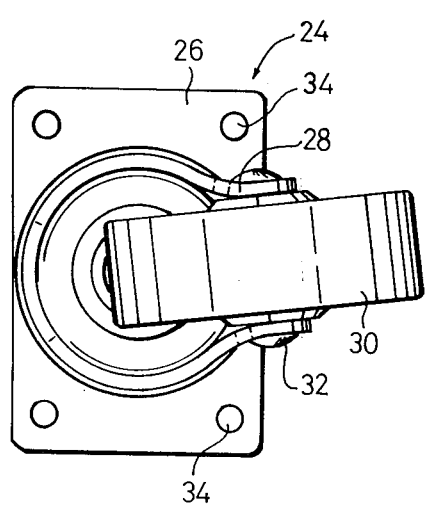
FIG. 2 is a bottom view of the caster roller.

In FIG. 2, the caster roller 24 is formed with a base plate 26 on which a roller support bracket 28 is rotatably mounted about a conventional ball bearing (not shown) and on this bracket a roller 30 is mounted to freely turn on a shaft 32 which is secured to the forked ends of the bracket 28, by heading the ends of the shaft 32. The roller 30 thus is enabled to freely swivel on the base plate 26. In the respective corner portions of the base plate 26, there are provided four openings 34.

When the caster roller 24 is attached to the seat 10, the resilient stopper 16 is despressed until the base plate 26 of the caster roller 24 is entirely received in the cavity 12 of the seat 10 and the point projection 18 of the resilient stopper 16 comes to fall into one of the corner openings 34 for preventing the base plate 26 from slipping out the seat 10.

Figure 3:
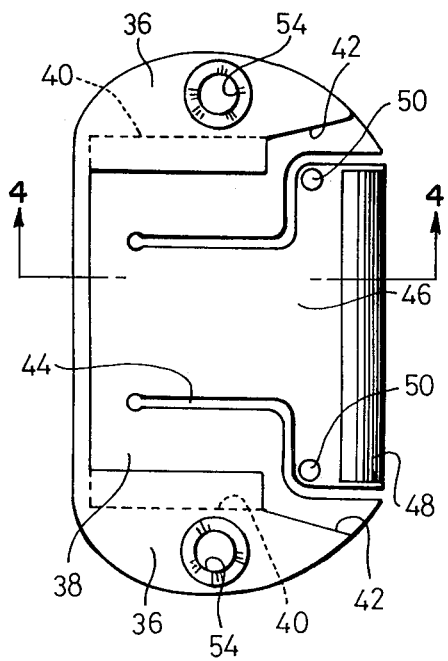
FIG. 3 is a perspective view of the seat for anchoring the caster roller in accordance with a second embodiment of the present invention.

In FIG. 3, the seat 36 for anchoring the caster roller 24 in accordance with the present invention is comprised of a rounded rectangular plate of a predetermined thickness of 10 mm for example and formed with a cavity 38 of virtually rectangular form with two symmetrical grooves 40, 40 adapted to embrace the opposite sides of the base plate 26 of the caster roller 24 and with two symmetrical guides 42, 42.

The cavity 38 at its flat bottom is provided with two symmetrical slits 44 of substantially "Z" form to provide a resilient bottom tongue 46 of T shape with a weir 48 formed along the edge of the tongue 46. Near the weir 48 are symmetrically provided with two point projections 50, 50.

Figure 4:
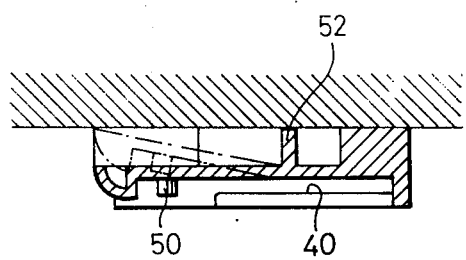
FIG. 4 is a sectional view of the seat of FIG. 3 taken along line 4—4 thereof and inverted to show same in an attached position to the end of the luggage.

As best shown in FIG. 4, the bottom tongue 46 at its rear side is provided with a rib 52 which acts as a lever to increase a resiliency of the bottom tongue. The reference numerals 54, 54 are openings for receiving studs or screws on securing the seat 36 to the luggage.

When the caster roller 24 is attached to the seat 36, the bottom tongue 46 at is outer end is depressed until the base plate 26 of the caster roller 24 is entirely received in the cavity 12 of the seat 36 and the point projections 50, 50 come to fall in two corner openings 34 of the base plate 26. The caster roller 24 is conveniently detached from the seat 36 by simply depressing the outer end of the tongue 46.

Figure 5:
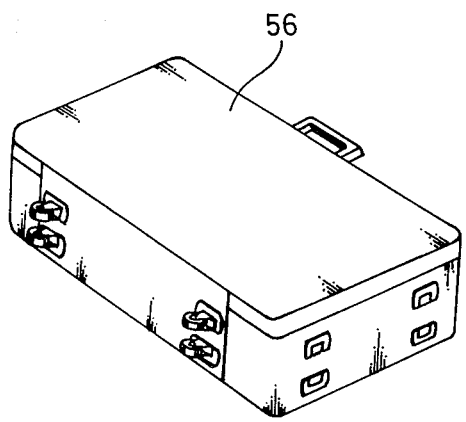
FIG. 5 is a perspective view of the suitcase, showing the four pairs of caster roller units in place thereon.

In FIG. 5, four pairs of the caster roller units in accordance with the present invention are attached to the bottom and lateral portions of the suitcase 56.

In accordance with the seat member of the present invention, the base plate of the caster roller is fully encompassed by four inner walls of the cavity including an inner wall of the weir so that the caster roller with its base plate does never make a loose movement in relation to the seat.

It is seen that by the present invention any person may readily equip a suitcase, trunk or similar piece of luggage, as a sample case, with caster rollers, which may be readily detached and again attached in place. The only permanent connection placed on the luggage or suitcase would be the seat member which may be readily secured to the bottom or lateral end of the luggage through the studs or screws.

While certain preferred embodiments of the invention have been illustrated by way of example in the drawings and particularly described, it will be understood that various modifications may be made in the constructions and that the invention is no way limited to the embodiments shown. For example, the resilient bottom tongue of the seat in substantially T shape may be preferably formed into a segment form.

I claim:

1. A detachable luggage caster roller unit comprising in combination: a seat member adapted to be secured to an end surface of a piece of luggage, said seat member including a bottom wall, upstanding side walls and a rear wall connected between said side walls, said side walls and said bottom wall being formed to define a pair of opposed forwardly extending lateral grooves closed at a location adjacent said rear wall and open at their forward ends, a pair of symmetrical slits being formed in said bottom wall extending from the region of said rear wall forwardly thereof to thereby define a resilient tongue, the free forward edge of said tongue being provided with a raised portion extending parallel to said rear wall, said bottom wall, rear wall, side walls and raised portion of said tongue defining a flat-bottomed substantially rectangular cavity therewithin, said tongue being pivotable about the fixed end portion thereof so as to facilitate reception of the base plate of a caster roller assembly within said cavity upon depression of the free edge of said tongue and lock said base plate within said cavity upon the release of said free edge of the tongue; and a caster roller assembly including a susstantially rectangular base plate dimensioned to be positioned within said cavity with a pair of opposed side edges thereof retained within said lateral grooves, a roller support bracket carried rotatably by said base plate, and a roller mounted rotatably in said roller support bracket whereby said roller is enabled to freely swivel about said bracket.

2. A detachable luggage caster roller unit as claimed in claim 1, wherein said tongue is provided on the surface thereof remote from said cavity with a transversely extending raised rib which is cooperable with said end face of the luggage to thereby serve as a fulcrum to increase the resiliency of the bottom tongue.

3. A detachable luggage caster roller unit as claimed in claim 1, wherein said base plate is provided with at least two openings located in adjacent corners thereof, said tongue being provided with a pair of spaced upstanding projections, said projections and openings being similarly spaced and dimensioned such that when said base plate is positioned within said cavity said projections will be received within respective ones of said base plate openings whereby said base plate is fixed within said cavity against movement therewithin.

* * * * *